United States Patent [19]

Akado et al.

[11] 4,126,109
[45] Nov. 21, 1978

[54] TEMPERATURE RESPONSIVE DEVICE FOR INTERNAL COMBUSTION ENGINE

[75] Inventors: Hajime Akado; Akihide Yamaguchi, both of Kariya; Yoshiro Uchida, Toyota, all of Japan

[73] Assignee: Nippon Denso Co., Ltd., Kariya, Japan

[21] Appl. No.: 739,190

[22] Filed: Nov. 5, 1976

[30] Foreign Application Priority Data

Nov. 19, 1975 [JP] Japan .............................. 50-157943

[51] Int. Cl.² .......................................... F02M 31/00
[52] U.S. Cl. ............................ 123/122 D; 123/179 H
[58] Field of Search ......... 123/122 D, 179 H, 180 EH

[56] References Cited

U.S. PATENT DOCUMENTS

| | | | |
|---|---|---|---|
| 3,394,687 | 7/1968 | Scott ................................. | 123/122 D |
| 3,459,163 | 8/1969 | Lewis ............................... | 123/122 D |
| 3,513,817 | 5/1970 | Kearsley ........................... | 123/122 H |
| 3,726,512 | 4/1973 | Herwig et al. .................... | 261/39 B |
| 3,744,716 | 7/1973 | Charles ............................. | 236/87 |
| 3,830,210 | 8/1974 | Muller et al. ..................... | 123/122 D |
| 3,858,565 | 1/1975 | Backman et al. ................. | 123/122 H |
| 3,913,544 | 10/1975 | Fyle ................................. | 123/122 D |
| 3,973,728 | 8/1976 | Colenutt ............................ | 236/13 |

*Primary Examiner*—Charles J. Myhre
*Assistant Examiner*—David D. Reynolds

*Attorney, Agent, or Firm*—Cushman, Darby & Cushman

[57] ABSTRACT

A thermostatic valve mounted in an air cleaner has an inlet connected to an intake manifold of an engine and an outlet connected to a negative pressure chamber of a negative pressure motor for actuating a switching valve pivotally mounted in a throat of the air cleaner, by the opening of the switching valve warmed air around an exhaust manifold of the engine being introduced into the air cleaner for the purpose of ensuring a smooth starting and operation of the engine. The thermostatic valve, for controlling the introduction of the warmed air as well as an amount of additional air fed to the engine as a function of the temperature in the air cleaner, has inside thereof a first passageway communicating the inlet with the inside thereof, a second passageway communicating the outlet with the inside and a third passageway communicating the inside with the air cleaner. A valve member is operatively disposed in both of the first and third passageways for respectively controlling the opening area of the first passageway and the opening and closing of the third passageway, so that the amount of the additional air is controlled through the first passageway and the application of the negative pressure from the intake manifold to the negative pressure motor is controlled by the closure and opening of the third passageway.

9 Claims, 9 Drawing Figures negative pressure motor intake manifold

TEMPERATURE RESPONSIVE DEVICE FOR INTERNAL COMBUSTION ENGINE

BACKGROUND OF THE INVENTION (1) Field of the Invention

The present invention relates to a temperature responsive device for an internal combustion engine to automatically control temperature of intake air to be supplied to the engine, and more particulary relates to an improved construction of a thermostatic valve having dual functions, one of which is to control the amount of the intake air fed to the engine in proportion and in response to the temperature of the engine or an air cleaner and the other of which is to control a negative pressure motor in response to the above engine temperature, the negative pressure motor proceeding a switching operation for introducing warmed air into a carburetor through the air cleaner and a control of the amount of the warmed air.

(2) Description of Prior Art

In a conventional thermostatic device for an internal combustion engine, a thermostatic valve is provided to detect temperature of intake air during a time when the temperature of the ambient air is cold especially during a winter season and to actuate a negative pressure motor as a function of the detected temperature so as to introduce warmed air to a downstream portion of a throttle valve mounted in a carburetor and to control the amount thereof, and another thermostatic valve is provided to introduce additional air into an intake manifold downstream of the carburetor for the purpose of preventing an extreme richness of an air-fuel mixture fed to the engine during a time when the ambient temperature is relatively high, especially during a summer season.

The conventional thermostatic device just described is disadvantageous in view of necessity of two kinds of thermostatic valves, complicated pipe lines for communicating the thermostatic valves with the associated portions such as the intake manifold, the carburetor and so on in an automotive engine compartment, and its high cost.

In another well-known thermostatic device of this kind, in which one valve is employed to proceed the above dual functions, a valve member is slidably but sealingly disposed in a valve housing being actuated to move down-and-upwardly by a temperature responsive expanding material such as wax, the down-and-upward movement of the valve member controlling both the amount of warmed air supplied to an engine through a carburetor and the amount of additional air fed to the engine.

The thermostatic valve has, however a disadvantage that a reliable operation may not be ensured for a long time since clearance between the outer surface of the valve member and the surrounding inner surface of the valve housing for the valve member becomes larger as it is used.

SUMMARY OF THE INVENTION

It is, therefore, an object of the present invention to provide a thermostatic device for an internal combustion engine which includes one thermostatic valve having dual functions for controlling introduction of warmed air to the engine as well as introduction of additional air to the engine as a function of the ambient temperature.

It is another object of the present invention to provide an improved thermostatic valve to overcome the above disadvantages.

It is a further object of the present invention to provide a novel and useful thermostatic device for an internal combustion engine which is durable in use for a long time and enables a reliable and minute control for the amount of additional air fed to the engine for preventing extreme richness of air-fuel mixture.

These and other objects, advantages and features of the present invention will become more apparent from the following description read in connection with the accompanying drawings.

DETAILED DESCRIPTION OF PREFERRED EMBODIMENTS

Figure 1:
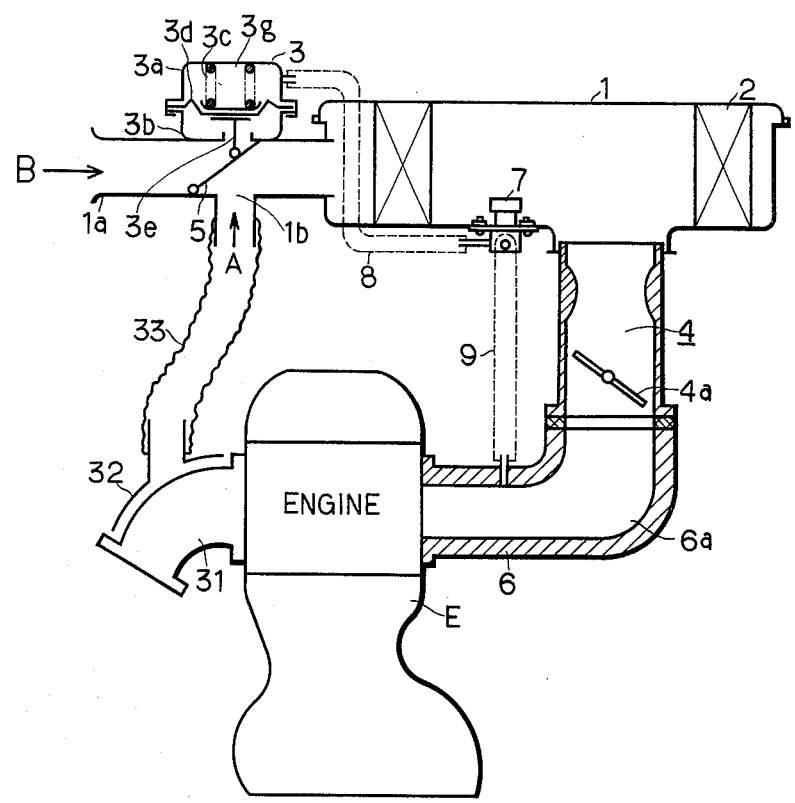
FIG. 1 is a schematic view partly in section of a temperature responsive device for an internal combustion engine in accordance with the present invention.

In FIG. 1 showing a thermostatic device for an internal combustion engine according to the present invention, an air cleaner 1 is communicated with an internal combustion engine E through a carburetor 4 and an intake manifold 6 as is well known. A filter element 2 is mounted in the air cleaner 1 for filtering air entering the carburetor 4 from a throat 1a of the air cleaner 1, which opens to the atmosphere. The carburetor 4 mixes fuel with air flowing therethrough as in the conventional manner to supply an air-fuel mixture to the engine E, wherein a throttle valve 4a linked with an acceleration pedal (not shown) is pivotally mounted to control the amount of the air-fuel mixture. An exhaust manifold 31 is communicated with the atmosphere to convey the exhaust gas to the atmosphere.

A switching valve 5 is pivotally mounted in the throat 1a to open and close an aperture 1b for permitting warmed air A to enter the air cleaner 1 when the aperture 1b is opened. The aperture 1b is connected through a conduit 33 to a heat receiving plate 32 which surrounds a portion of the exhaust manifold 31. Air from the atmosphere enters the conduit 33 passing along the plate 32 while being warmed by hot outer walls of the exhaust manifold 31 surrounded by the plate 32. When the switching valve 5 closes the aperture 1b, the ambient air B enters the air cleaner 1.

The switching operation of the valve 5 is carried by a negative pressure motor 3 mounted on the throat 1a which includes an upper and a lower housings 3a and 3b fixed to the upper portion of the throat 1a, a diaphragm 3d interposed between the housings 3a and 3b to form a sealed negative pressure chamber 3g, a spring 3c disposed in the chamber 3g for resiliently urging the diaphragm 3d in a downward direction, and a rod 3e connecting the diaphragm 3d with the switching valve 5 for actuating the same to open and close the aperture 1b in accordance with the down-and-upward movement of the diaphragm 3d. When the negative pressure is applied to the chamber 3g, the diaphragm 3d moves upwardly against the resilient force of the spring 3c with the valve 5 being opened as shown in FIG. 1, while when the negative pressure is removed from the chamber 3g the diaphragm 3d moves downwardly due to the urging force of the spring 3c. The chamber 3g is communicated with the inside 6a of the intake manifold 6 through a conduit 8, a thermostatic valve 7 and a conduit 9 to apply the intake vacuum at the intake manifold to the chamber 3g when the thermostatic valve 7 connects the conduit 9 with the conduit 8 as a function of the temperature in the air cleaner 1.

Figure 2:
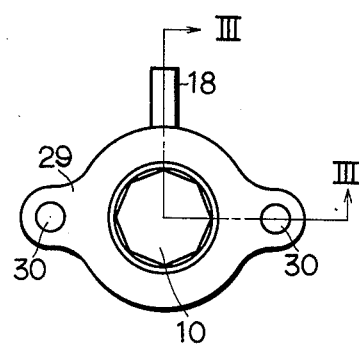
FIG. 2 is a top plan view of a thermostatic valve according to the present invention.

The detailed construction and operation will be explained with reference to FIGS. 2 and 3 hereinafter.

A temperature responding portion 10 comprises a top portion 10a made of a heat conducting material such as copper, a temperature responsive expanding material 10b such as wax sealed in the top portion 10a by means of a diaphragm 10e so that the diaphragm 10e is expansible in accordance with the expansion of the wax 10b, a housing 10d fixed to the top portion 10a, and a driving lever 10c slidably supported in a bore of the housing 10d so that the driving lever is moved back and forth in accordance with the expansion of the wax and thereby the movement of the diaphragm 10e. The temperature responding portion 10 is exposed inside of the air cleaner 1 for detecting the temperature thereof.

The lower end of the housing 10d is screwed into a housing 15 made of a synthetic resin, which includes a central bore 12 for providing a space to enable a free up-and-downward movement of the driving lever 10c, apertures 11 communicating the bore 12 with the atmosphere (the inside of the air cleaner 1 according to the invention), a valve seat 13 of a semi-spherical surface formed at an undersurface of the housing 15 at which the lower end of the bore 12 terminates, and a shoulder 14 at which the upper end of the bore 12 terminates for abutting the lower end of the housing 10d.

A valve casing 16 made of a synthetic resin is secured to the housing 15 by means of, for example ultrasonic-wave welding to thereby seal the inside of the valve casing 16 from the atmosphere, wherein the housing 15 serves as an upper wall of the valve casing 16. The valve casing 16 comprises a pipe portion (or an outlet) 18 having a restriction of 0.7 Φ for preventing a rapid air flow therethrough and connected to the negative pressure motor through the conduit 8, another pipe portion (or an inlet) 19 connected to the intake manifold 6 through the conduit 9, and a flanged portion 29 formed at the upper peripheral portion of the valve casing 16 and having holes 30 through which bolts (not shown) would be inserted to secure the thermostatic valve 7 to the air cleaner 1.

Inside of the valve casing 16, a valve member 20, a spring 25 and a cup-shaped member 26 are disposed to proceed dual functions in response to the temperature detected by the temperature responding portion 10.

The valve member 20 includes a flanged portion 23 formed at an outer periphery of a valve body 20a, a convex portion 22 of semi-spherical formed on the valve body 20a, a concave portion 21 provided at the valve body for receiving the lower end of the driving lever 10c, and a rod 24 directed in a direction opposite to the convex portion 22. The lower end of the rod 24 is formed with an enlarged section 24a having a diameter of 3.9Φ which is larger than that of 2.0Φ of an upper small section 24c. A tapered section 24b connects the enlarged section 24a with the small section 24c.

The spring 25 is interposed between the flanged portion 23 of the valve member 20 and a flanged portion 28 of the cup-shaped member 26 for urging the valve member 20 upwardly, that is, in a direction of the valve seat 13, so that the semi-spherical convex portion 22 of the valve body 20a seats on the valve seat 13 to shut off the air flow from the air cleaner 1 through the apertures 11 and the central bore 12 into the inside of the valve casing 16.

The cup-shaped member 26 includes the flanged portion 28 seating on the base of the valve casing 16 by the urging force of the spring 25, a cylindrical side wall and a top wall at which an opening 27 is formed with a diameter of 4.0Φ. The lower end of the rod 24 is inserted into the opening 27, so that the clearance between the rod 24 and the opening 27 changes in accordance with the down-and-upward movement of the valve member 20 actuated by the temperature responding portion 10.

In the above-described thermostatic valve 7, the opening 27 formed at the cup-shaped member 26 forms a first passageway for communicating the inlet 19 with the inside of the valve casing 16, the restriction 17 formed in the pipe portion 18 forms a second passageway for communicating the outlet 18 with the inside of the valve casing 16, and the apertures 11 and the central bore 12 forms a third passageway for communicating the inside of the valve casing with the inside of the air cleaner 1.

As noted from the above description, the valve member 20, especially the convex portion 22 in this embodiment, is disposed in the third passageway for opening and closing the same in accordance with the detected temperature at the temperature responding portion 10. The rod 24 of the valve member is operatively disposed in the first passageway for varying the opening area of the passageway in accordance with the detected temperature at the temperature responding portion 10.

The operation of the thermostatic valve 7 just described will be explained with reference to FIGS. 4 and 5.

Figure 3:
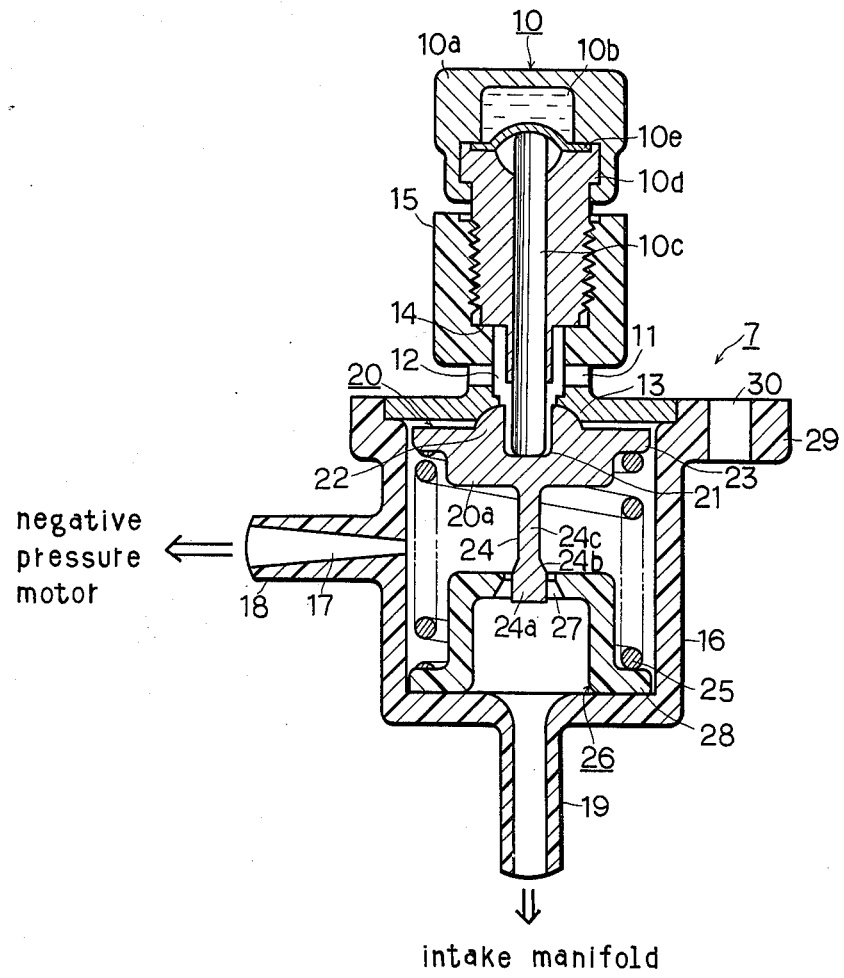
FIG. 3 is an enlarged sectional view taken along a line III—III in FIG. 2 showing an embodiment of the present invention.

When the ambient temperature is below 27° C, the temperature responsive expanding material 10b does not expand so that the valve member 20 is urged at its uppermost position by the urging force of the spring 25 as shown in FIG. 3, with the convex portion 22 seating on the valve seat 13 (the third passageway is thereby closed). At this stage, the negative pressure from the intake manifold 6 through the pipe portion 19 is transmitted to the negative pressure chamber 3g of the negative pressure motor 3 through the clearance between the rod 24 and the opening 27 (that is the first passageway), the restriction 17 of the pipe portion 18 (second passageway) and the conduit 8, so that the diaphragm 3d is moved upwardly together with the switching valve 5 by means of the rod 3e. When the valve 5 opens the aperture 1b, warmed air A is permitted to enter the air cleaner 1 and then to the engine E, thus ensuring a smooth starting and operation of the engine. Since the negative pressure is applied to the negative pressure motor through the restriction 17, the switching operation of the switching valve 5 is smoothly carried out.

On the other hand, since the valve member 20 is seating on the valve seat 13 (or the third passageway is closed), no air flows from the apertures 11 through the third passageway and the first passageway to the conduit 9 and then to the intake manifold 6.

Figure 4:
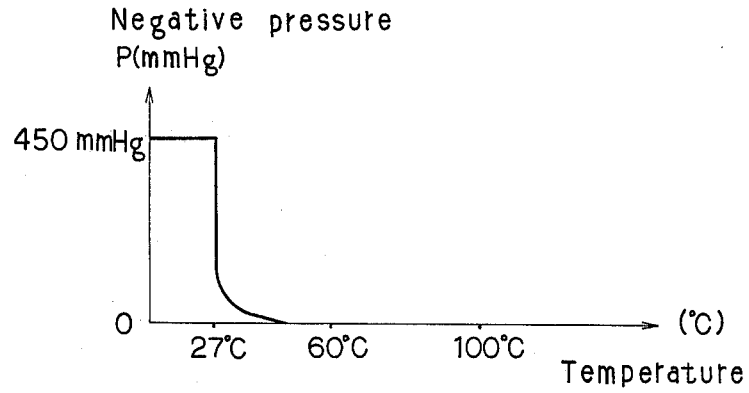
FIGS. 4 and 5 are graphical views showing characteristics of negative pressure in a negative pressure motor and an amount of additional air fed to the engine with respect to temperature variations in an air cleaner in accordance with operation of the thermostatic valve shown in FIG. 3.
Figure 5:
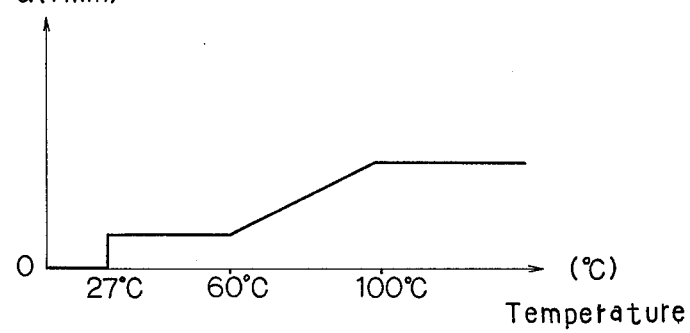

FIG. 4 shows the amount of the negative pressure in the negative pressure chamber 3g of the negative pressure motor 3 at the ordinate with respect to the temperature variations in the air cleaner 1 at the abscissa, while FIG. 5 shows the amount of additional air fed to the engine through the thermostatic valve 7 at the ordinate with respect to the temperature variations in the air cleaner 1 at the abscissa.

FIGS. 4 and 5 respectively show characteristics measured when the negative pressure at the intake manifold 6 is constantly 450 mmHg.

When the temperature in the air cleaner 1 is above 27° C but below 60° C, the temperature responsive expanding material is expanded so that the valve member 20 is moved downwardly against the urging force of the spring 25 via the driving lever 10c. When the valve member 20 is moved downwardly and the convex portion 22 is departed from the valve seat 13, the third passageway is opened and thereby the negative pressure inside of the valve casing 16 is decreased to almost the ambient pressure, whereby the negative pressure is removed from the chamber 3g to actuate the switching valve 5 to close the aperture 1b.

On the other hand, when the convex portion 22 of the valve member 20 is departed from the valve seat 13, air is introduced into the inside of the valve casing through the third passageway including the apertures 11 and the bore 12. The air is then conveyed through the clearance between the rod 24 and the opening 27, that is the first passageway to the intake manifold as additional air for preventing an excess of fuel to be supplied to the engine, wherein the amount of the additional air is determined by the area of the clearance (the opening area of the first passageway). Under the temperature variations of 27° C to 60° C in the air cleaner 1, the enlarged section 24a is designed to be always positioned in a plane of the opening 27, so that the area of the clearance determined by the enlarged section 24a and the opening is constant with the result that the amount of the additional air flowing therethrough is likewise constant.

When the temperature in the air cleaner 1 becomes above 60° C but below 100° C, the valve member 20 is further moved downwardly so that the tapered section 24b becomes in the plane of the opening 27, while the third passageway remains opened. Therefore, as the rod 24 is moved downwardly, the area of a clearance determined by the tapered section 24b and the opening 27 (the opening area of the first passageway) is increased so that the amount of the additional air is increased as shown in FIG. 5.

During this period, since the third passageway remains opened the aperture 1b in the throat 1a of the air cleaner remains closed by the switching valve 5.

When the temperature in the air cleaner 1 becomes above 100° C, the valve member 20 is furthermore moved downwardly, so that the small section 24c of the rod 24 becomes in the plane of the opening to define the clearance therebetween, while the third passageway remains opened. Since the diameter of the small section 24c is arranged to be constant along its entire length, the amount of the additional air is constant as shown in FIG. 5.

When the temperature in the air cleaner 1 is decreasing, the amount of the additional air fed to the engine is likewise decreased corresponding to the characteristic shown in FIG. 5.

Figure 6:
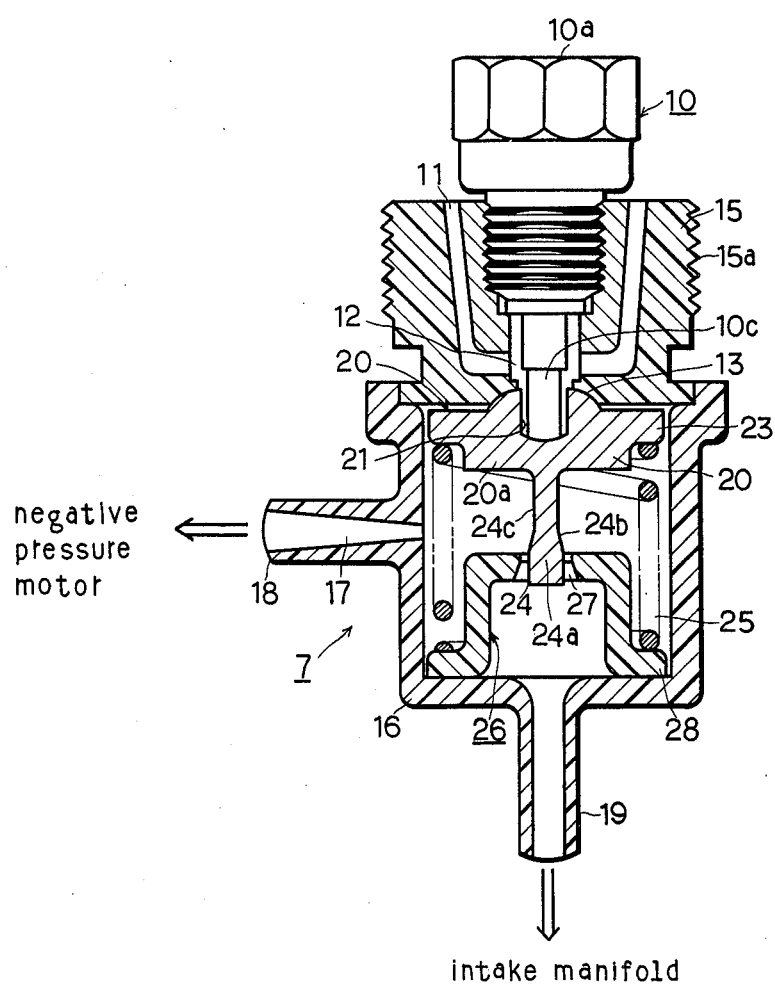
FIG. 6 is a sectional view of a thermostatic valve showing a modified embodiment of the present invention.

FIG. 6 shows a modified construction of the thermostatic valve 7 according to the present invention, wherein like reference numerals designate the same or equivalent parts of that shown in FIG. 3.

A threaded portion 15a is formed at the outer periphery of the housing 15, so that the valve 7 is secured to the air cleaner 1 by means of a screw-fitting.

Apertures 11 for introducing air to the inside of the valve casing 16 are formed in the housing 15 being directed upwardly and opened inside of the air cleaner.

Figure 7:
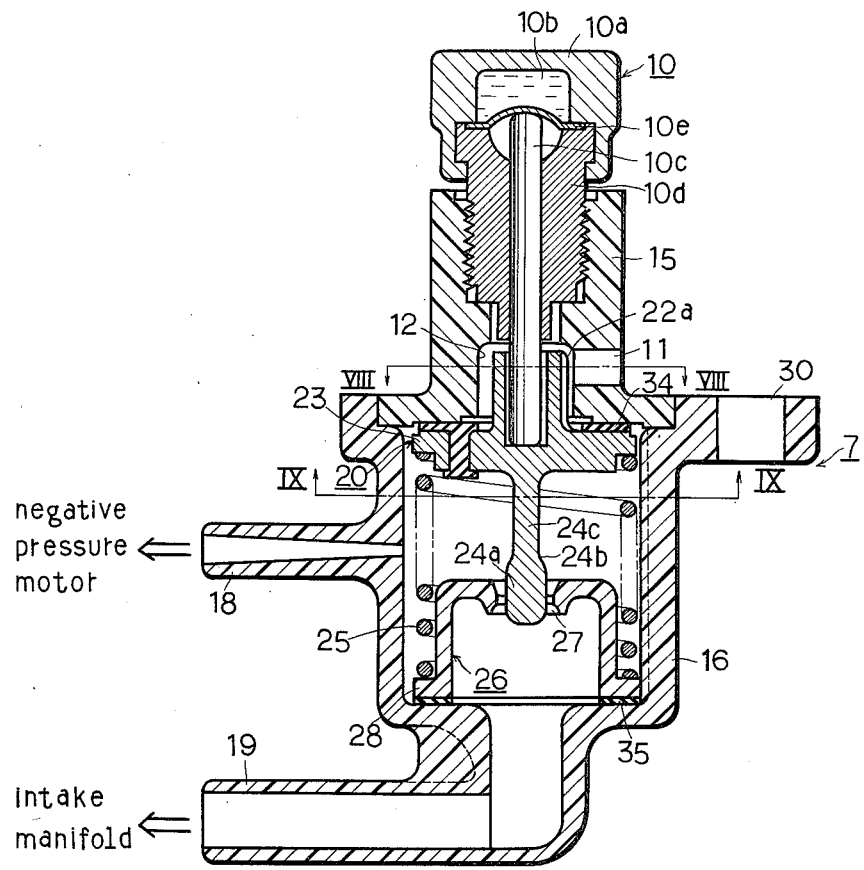
FIG. 7 is also a sectional view of a thermostatic valve showing a further modified embodiment of the present invention.

FIG. 7 shows a further modified construction of the thermostatic valve 7 according to the present invention, wherein like reference numerals likewise designate the same or equivalent parts as that shown in FIG. 3.

Figure 8:
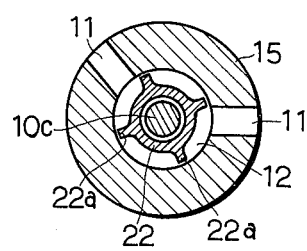
FIG. 8 is a sectional view taken along line VIII—VIII in FIG. 7.

A convex portion 22 of the valve member 20 projects into the bore 12 of the housing 15, and guide portions 22a axially formed at and along the length of the outer periphery of the convex portion 22 are guided by the inner surface of the bore as shown in FIG. 8, so that the axial movement of the valve member 20 is smoothly carried out and air from the air cleaner 1 can enter inside of the valve casing 16 along the outer surface of the convex portion 22.

A ring-formed sealing member 34 made of a silicon rubber is attached on the upper surface of the flanged portion 23 of the valve member 20 and fixedly secured thereto by means of a plurality of protrusions 34a, one of which is shown in FIG. 7. The protrusions 34a are made of the silicon rubber and formed integral with the sealing member 34. Englarged portions are provided at the respective free ends of the protrusions 34a which are inserted into a plurality of through holes formed at the valve member 20, so that the sealing member 34 is fixedly secured to the valve member 20.

The sealing member 34 is seated on the under-surface of the housing 15 when the valve member 20 is positioned at its uppermost position as shown in FIG. 7, so that the inside of the valve casing 16 is shut off from the atmosphere.

A packing 35 made of rubber is interposed between the base of the valve casing 16 and the flanged portion 28 of the cup-shaped member 26 for the purpose of ensuring sealing between the base and the flanged portion 28.

Figure 9:
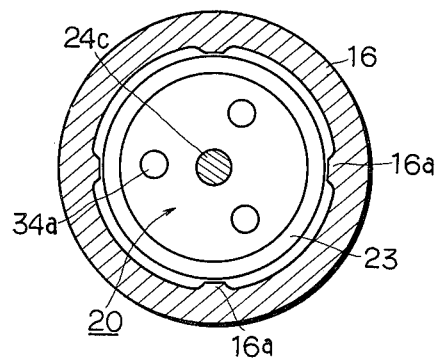
FIG. 9 is a sectional view taken along line IX—IX in FIG. 7.

At the inner wall of the valve casing 16, there are provided a plurality of projections 16a inwardly directed and formed along the axial length of the inner wall as shown in FIG. 9, so that the valve member 20 moves upwardly and downwardly being guided at the flanged portion 23 along the plurality of projections 16a.

What is claimed is:

1. A temperature responsive device for an internal combustion engine comprising:
   an air cleaner connected to an intake manifold of an internal combustion engine for supplying air thereto through a filter element mounted in said air cleaner, said air cleaner having a throat opening to the atmosphere for introducing air from the atmosphere into said air cleaner, said throat having an aperture;

a switching valve pivotally mounted in said throat adjacent to said aperture for closing and opening the same;

a negative pressure motor mounted on said throat and having a negative pressure chamber and a movable diaphragm responding the negative pressure applied to said negative pressure chamber, said diaphragm being connected to said switching valve so that said switching valve is actuated to close and open said aperture in response to the movement of said diaphragm;

a conduit connected to said aperture at one end and opening to a portion of an exhaust manifold of said engine so as to introduce warmed air around said exhaust manifold into said air cleaner when said aperture is opened; and a thermostatic valve mounted in said air cleaner having an inlet connected to said intake manifold and an outlet connected to said negative pressure chamber, wherein said thermostatic valve comprises:

a temperature responding portion exposed inside of said air cleaner for detecting the temperature in said air cleaner;

a valve casing coupled to said temperature responding portion and having said inlet and outlet;

a first passageway communicating said inlet with the inside of said valve casing;

a second passageway communicating said outlet with said inside of said valve casing, said first and second passageways being always communicated with each other;

a third passageway communicating said inside of said valve casing with the inside of said air cleaner;

a valve member connected to said temperature responding portion and operatively disposed in said third passageway for opening and closing the same in accordance with the detected temperature at said temperature responding portion, said valve member closing said third passageway when the detected temperature is lower than a predetermined value, so that no additional air is supplied to said intake manifold and that the negative pressure from said intake manifold is applied to said negative pressure chamber of said negative pressure motor through said inlet, said first passageway, said inside of said valve casing, said second passageway and said outlet, whereby said switching valve is actuated to open said aperture so as to introduce the warmed air to said air cleaner;

said valve member opening said third passageway when the detected temperature is higher than said predetermined value, so that said negative pressure chamber is communicated to the atmosphere through said second and third passageways and that said negative pressure from said intake manifold is no longer applied to said negative pressure chamber of said negative pressure motor, resulting in the closure of said aperture by said switching valve, the opening of said third passageway by said valve member enabling air from said air cleaner to flow through said third passageway, said inside of said valve casing, and said first passageway, the air being fed to said intake manifold as additional air for said engine; and a rod coupled to said valve member and operatively disposed in said first passageway for varying although not closing off the opening area thereof in accordance with the detected temperature at said temperature responding portion, so that the amount of the additional air is controlled in accordance with the detected temperature at said temperature responding portion.

2. A temperature responsive device according to claim 1, wherein said temperature responding portion comprises:

a top portion;

a temperature responsive expanding material encased in said top portion;

a diaphragm attached to said top portion for sealing said temperature responsive expanding material, so that said diaphragm is expansible in accordance with expansion of said expanding material; and a driving lever associated with said diaphragm to move back and forth in accordance with the movement of said expansible diaphragm.

3. A temperature responsive device according to claim 2, wherein said valve casing includes an upper wall on which said temperature responding portion is mounted, said upper wall having a central bore through which said driving lever is extending, said bore terminating at a valve seat formed at an undersurface of said upper wall, and said bore being communicated with the atmosphere to form said third passageway.

4. A temperature responsive device according to claim 3, further comprising a spring disposed in said valve casing for biasing said valve member in a direction of said valve seat, so that a portion of said valve member seats on said valve seat to close said third passageway.

5. A temperature responsive device according to claim 4, wherein said valve seat is formed with a semispherical surface and said portion of said valve member is likewise formed with a semi-spherical surface.

6. A temperature responsive device according to claim 1, wherein said second passageway comprises a restriction so that a rapid application and removal of the negative pressure for said negative pressure chamber is avoided.

7. A temperature responsive device according to claim 1, wherein said first passageway is formed of a cup-shaped member disposed in said valve casing and covering said inlet, said cup-shaped member being provided with an opening through which said inlet is communicated with the inside of said valve casing.

8. A temperature responsive device according to claim 7, wherein said rod of said valve member comprises:

an enlarged section at its lowest portion;

a small section at its upper section; and a tapered section formed between said enlarged section and said small section, whereby the opening area of said first passageway is varied in response to the detected temperature at said temperature responding portion.

9. A thermostatic valve for use with a negative pressure motor for controlling the introduction of hot air into an intake system of an engine comprising:

temperature responding means;

a valve casing having an inlet to be connected to an intake manifold of the engine, an outlet to be connected to a negative pressure chamber of the negative pressure motor, a first passageway communicating said inlet with the inside of said valve casing, a second passageway communicating said outlet with the inside, and a third passageway communicating the inside with the atmosphere said first and second passageways being always communicated with each other through the inside of said valve casing;

a valve member connected to said temperature responding means and operatively disposed in said third passageway for opening and closing the same in accordance with detected temperature at said temperature responding means, said valve member closing said third passageway when the detected temperature is lower than a predetermined value, so that said outlet is shut off from the atmosphere and is communicated with said inlet and that no air is allowed to flow through said third passageway to said first passageway, said valve member opening said third passageway when the detected temperature is higher than said predetermined value, so that said outlet becomes in communication with the atmosphere; and a rod coupled to said valve member and operatively disposed in said first passageway for varying although not closing off the opening area thereof in accordance with the detected temperature at said temperature responding means, so that an amount of air flowing through said first passageway is controlled.

* * * * *

UNITED STATES PATENT AND TRADEMARK OFFICE
CERTIFICATE OF CORRECTION

PATENT NO. : 4,126,109

DATED : November 21, 1978

INVENTOR(S) : AKADO, et al.

It is certified that error appears in the above-identified patent and that said Letters Patent is hereby corrected as shown below:

On the Title page, the assignment data should read as follows:

[73] Assignee: NIPPONDENSO CO., LTD., Kariya, Japan

Signed and Sealed this

Seventh Day of January, 1992

Attest:

HARRY F. MANBECK, JR.

*Attesting Officer*   *Commissioner of Patents and Trademarks*